(12) United States Patent
Marom

(10) Patent No.: US 11,115,579 B2
(45) Date of Patent: Sep. 7, 2021

(54) METHOD FOR SWITCHING OPTICAL FIELDS OF VIEW

(71) Applicant: Itshak Marom, Haifa (IL)

(72) Inventor: Itshak Marom, Haifa (IL)

(*) Notice: Subject to any disclaimer, the term of this patent is extended or adjusted under 35 U.S.C. 154(b) by 0 days.

(21) Appl. No.: 16/774,102

(22) Filed: Jan. 28, 2020

(65) Prior Publication Data

US 2020/0244855 A1 Jul. 30, 2020

Related U.S. Application Data

(60) Provisional application No. 62/797,957, filed on Jan. 29, 2019.

(51) Int. Cl.
*H04N 5/225* (2006.01)

(52) U.S. Cl.
CPC ......... *H04N 5/2259* (2013.01); *H04N 5/2253* (2013.01); *H04N 5/2254* (2013.01)

(58) Field of Classification Search
CPC .. H04N 5/2259; H04N 5/2253; H04N 5/2254; G02B 17/0808; G02B 7/08; G02B 3/10
See application file for complete search history.

(56) References Cited

U.S. PATENT DOCUMENTS

| | | | | |
|---|---|---|---|---|
| 10,133,043 B1* | 11/2018 | Lu | .................... | G02B 17/0808 |
| 2013/0010180 A1* | 1/2013 | Hatakeyama | ...... | G02B 17/0808 348/360 |
| 2013/0321668 A1* | 12/2013 | Kamath | .............. | H04N 5/2254 348/239 |
| 2018/0100996 A1* | 4/2018 | Svec | .................... | G02B 17/086 |
| 2020/0124824 A1* | 4/2020 | Ono | ........................ | G03B 13/36 |

* cited by examiner

*Primary Examiner* — Jason A Flohre
(74) *Attorney, Agent, or Firm* — Mark M. Friedman

(57) ABSTRACT

A digital camera has a dual field of view optical system with two separate focal planes, whose images fall simultaneously on a single imaging sensor, an actuator to move the optical system along an optical axis, and a digital processor associated with the imaging sensor. The actuator moves the optical system so that the imaging sensor is sequentially in each of the focal planes, and the digital processing element co-processes images sampled from each of the focal planes to as to derive images with two fields of view.

8 Claims, 1 Drawing Sheet

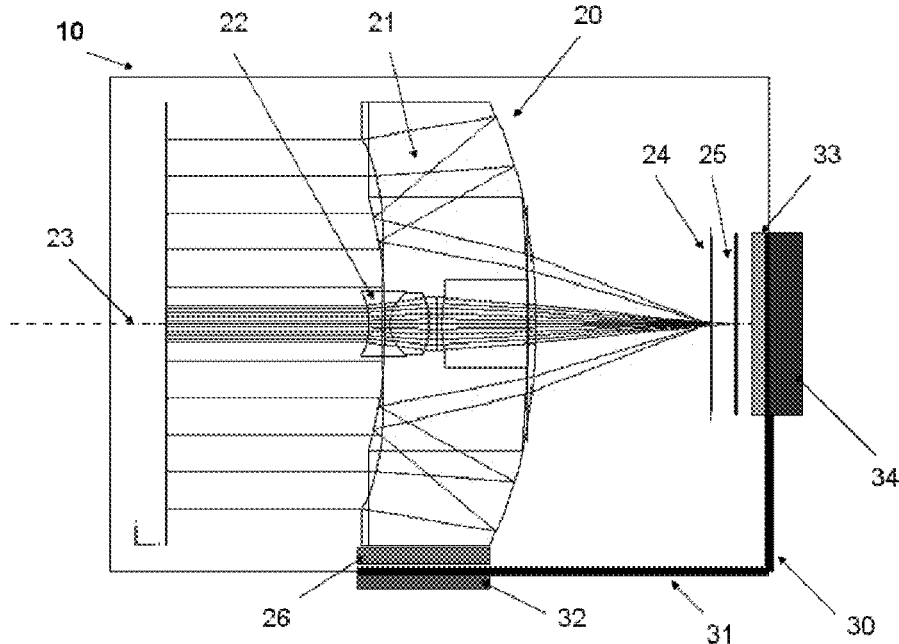

When:

| | |
|---|---|
| FOV | Field of View |
| [N] | The desired narrow FOV image |
| [W] | The desired wide FOV image |
| $f_W$ | The point spread function that represents the defocused blur of the wide FOV image |
| $f_N$ | The point spread function that represents the defocused blur of the narrow FOV image |
| [$I_N$] | The image obtained at the narrow FOV's focal plane |
| [$I_W$] | The image obtained at the wide FOV's focal plane |
| * | The convolution sign |

FIG. 2

METHOD FOR SWITCHING OPTICAL FIELDS OF VIEW

FIELD OF THE INVENTION

The present invention relates to images obtained simultaneously at a single imaging sensor of a digital camera, from different optical systems associated with different fields of view; and provides a method for switching between fields of view, specifically, for switching between images when the single imaging sensor is located at the focal plane of one of the optical systems, while the others are defocused.

BACKGROUND OF THE INVENTION

There are known optical systems and cameras for providing a variable field of view, such as a catadioptric optical system, by moving optical elements into and out of the optical path to the sensor, or by using a blocking element selectively operable, in order to simultaneously enable and block the passage of light in alternate optical paths to the sensor. The movement of these optical and blocking elements is accomplished by a relatively complex mechanism that requires space in the optical system associated with the sensor.

An example of such a system is disclosed in U.S. Pat. No. 4,354,742 to Able et al., based on the movement of a secondary mirror in and out of a fixed objective. Another example of this approach is found in British Pat. No. 1,423,257, where a rotating lens is used. An example of an alternate blocking element is found in U.S. Pat. No. 5,113,281.

Applications of a switching mechanism in dual field of view systems using movable lenses are also found in cameras, as disclosed in German Patent No. DE 3,444,753 and U.S. Pat. No. 4,037,939.

SUMMARY OF THE INVENTION

Accordingly, it is a principal object of the present invention to overcome the above disadvantages and provide a method for switching between fields of view, which is based on the existing axial movement of the lenses for focusing the image at the camera's sensor. The case of plural optical paths associated with different fields of view that have separate focal planes and a single imaging sensor, can be resolved by mathematical manipulations to attain the image from the desired field of view, assuming that the image obtained simultaneously at the focal plane of the desired field of view is a combination of the desired image and the defocused images from the others fields of view. The defocused image for a given deviation from the focal plane can be calculated by commercials optical simulations. For a camera with two fields of view and a single imaging sensor, attaining the image associated with one of the optical paths requires obtaining the images at both focal planes by moving the lenses accordingly.

In accordance with a preferred embodiment of the invention, a digital camera with a dual field of view optical system associated simultaneously with a single imaging sensor is provided. The optical system provides alternate optical paths which are associated with a wide and a narrow field of view and have a common optical axis. The narrow field of view's focal plane is separate from that of the wide field of view. The optical system moves along the optical axis to alternate the focus between either field of view. In accordance with the preferred embodiment, the optical system focusing means consists of a magnet and coils. The camera is equipped with a processor adequate for performing the mathematical manipulations required for switching between the fields of view and for presenting qualitative images as well as controlling the camera to perform a sequence of operations as described.

Other features and advantages of the invention will become apparent from the following drawings and description.

BRIEF DESCRIPTION OF THE DRAWINGS

For a better understanding of the invention, reference is made to the accompanying drawings, in which like numerals refer to corresponding elements or sections throughout, and in which:

FIG. 1 shows a dual field of view digital camera with separates focal planes.

FIG. 2 shows basic mathematical formulations for the switching method.

DETAILED DESCRIPTION OF THE PREFERRED EMBODIMENT

Referring now to FIG. 1, it shows a preferred embodiment of a dual field of view digital camera 10 with a single imaging sensor and separates focal planes, which is constructed and operated in accordance with the principles of the present invention. The digital camera 10 comprises a dual field of view optical system 20 and the camera housing 30. The optical system 20 comprises a catadioptric monoblock lens 21 associated with the narrow field of view and refractive lenses 22 associated with the wide field of view and is located at the central obscuration of lens 21. Lens 21 has refractive and reflective aspheric surfaces at both sides. The lenses 21 and 22 have common optical axis 23 and separate focal planes 24 and 25 with separation greater than the focal depth of the lenses. A magnet 26 is attached to the optical system 20. The camera housing 30 comprises the case 31, the coils 32, the imaging sensor 33 and the digital processor 34, which preferably serves as both a controller for the system and as a digital image processing element. The digital processor 34 is associated with the coils 32 and the sensor 33. The coils 32 are associated with the magnet 26 for moving the optical system 20 in both directions along the optical axis 23 in order to alternate focus between the fields of view as part of the switching method.

Referring now to FIG. 2, here the basic mathematical formulations for attaining either the image from the narrow field of view or that from the wide field of view are shown. The formulations take to account that the image obtained at the focal plane of each one of the fields of view is the combination of the focused and the defocused lenses.

Equation 1 describes the image obtained in the sensor which is located at the focal plane of the lens with the narrow field of view.

Equation 2 describes the image obtained in the sensor which is located at the focal plane of the lenses with the wide field of view.

It is possible to solve the above equations in an iterative method. Calculating $W_{n+1}$ and $N_{n+1}$ using $I_N$, $I_W$, $f_N$, $f_W$, $W_n$ and $N_n$ . . . . Assuming that $W_0$ is $I_W$ and $N_0$ is $I_N$. The iterations continue until the distances between $W_n$ and $W_{n+1}$ and between $N_n$ and $N_{n+1}$ are below a certain threshold, when n is the iteration number.

In summary, it can be seen that the present invention offers a simplified switching method for a single sensor dual field of view digital camera, based on the existing built-in focusing mechanism.

While this disclosure has been described in terms of certain embodiments and generally associated methods, alternations and permutations of the embodiments and methods will be apparent to those skilled in the art. The disclosure is to be understood as not limited by the specific embodiments described herein, but only by the scope of the appended claims.

What is claimed is:

1. A digital camera comprising:
   a. a dual field of view optical system comprising a first lens arrangement forming an image of a first field of view focused at a first focal plane and a second lens arrangement forming an image of a second field of view focused at a second focal plane axially spaced from said first focal plane, said second field of view being wider than said first field of view, said first lens arrangement and said second lens arrangement being combined on a common optical axis,
   b. a single imaging sensor deployed to receive images simultaneously from said first lens arrangement and said second lens arrangement,
   c. an actuator deployed to move said optical system along the optical axis between a first position in which an image from said first lens arrangement is focused on said imaging sensor and an image from said second lens arrangement is defocused and a second position in which an image from said second lens arrangement is focused on said imaging sensor and an image from said first lens arrangement is defocused, and
   d. a digital processing element associated with said imaging sensor and configured to receive images sampled when said optical system is in said first position and said second position, and to co-process said sampled images to derive at least one output image selected from the group consisting of: a first output image with said first field of view and a second output image with said second field of view.

2. The digital camera of claim 1 wherein said first lens arrangement comprises a catadioptric monoblock lens and said second lens arrangement comprises refractive lenses located at a central obscuration of said catadioptric monoblock lens.

3. The digital camera of claim 1 wherein said actuator for moving said optical system comprises a magnet or electromagnet associated with coils.

4. The digital camera of claim 1 wherein said single sensor is a CCD or CMOS sensor, or an uncooled infrared detector.

5. The digital camera of claim 1 further comprising a controller associated with said actuator and with said digital processing element, said controller being configured to:
   a. operate said actuator to move said optical system so that said imaging sensor is sequentially in said first position and said second position, and
   b. actuate said digital processing element to co-process images sampled from said imaging sensor at each of said focal planes so as to derive said at least one output image.

6. The digital camera of claim 1 integrated with an electronic mobile device.

7. The digital camera of claim 1 wherein said digital processing element is configured to co-process said sampled images so as to find an output image [N] with said first field of view and an output image [W] with said second field of view such that [N] and [W] satisfy the equations:

$$[N]+f_W*[W]=[I_N], \text{ and}$$

$$[W]+f_N*[N]=[I_W]$$

where:
   $[I_N]$ is the image sampled when said optical system is in said first position,
   $[I_W]$ is the image sampled when said optical system is in said second position,
   $f_W$ is a point spread function corresponding to the defocused blur of an image from said second lens arrangement when said optical system is in said first position,
   $f_N$ is a point spread function corresponding to the defocused blur of an image from said first lens arrangement when said optical system is in said second position, and
   * is the convolution sign.

8. The digital camera of claim 7, wherein said digital processing element is configured to co-process said sampled images to solve said equations by an iterative method.

* * * * *